(12) United States Patent
Okumura et al.

(10) Patent No.: US 8,488,269 B2
(45) Date of Patent: Jul. 16, 2013

(54) LIBRARY APPARATUS

(75) Inventors: Shoichi Okumura, Kawasaki (JP); Yoshio Kotaki, Kawasaki (JP); Ichiro Sakuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 12/985,436

(22) Filed: Jan. 6, 2011

(65) Prior Publication Data
US 2011/0181980 A1    Jul. 28, 2011

(30) Foreign Application Priority Data

Jan. 22, 2010  (JP) ................................ 2010-012279

(51) Int. Cl.
*G11B 15/68*  (2006.01)

(52) U.S. Cl.
USPC ........................................ 360/92.1; 369/30.45

(58) Field of Classification Search
USPC .................. 360/92.1; 369/30.4, 30.43, 30.45, 369/30.49; 414/267, 281
See application file for complete search history.

(56) References Cited

U.S. PATENT DOCUMENTS

| | | | | |
|---|---|---|---|---|
| 4,361,858 A * | 11/1982 | Chambers | ..................... | 360/92.1 |
| 4,484,239 A * | 11/1984 | Timm | .......................... | 360/92.1 |
| 4,820,109 A * | 4/1989 | Witt | ................................ | 414/282 |
| 4,910,619 A * | 3/1990 | Suzuki et al. | ................. | 360/92.1 |
| 4,972,277 A * | 11/1990 | Sills et al. | ..................... | 360/92.1 |
| 5,184,260 A * | 2/1993 | Pierrat | .......................... | 360/92.1 |
| 5,293,284 A * | 3/1994 | Sato et al. | ..................... | 360/92.1 |
| 5,856,894 A * | 1/1999 | Marlowe | ....................... | 360/92.1 |
| 6,064,544 A * | 5/2000 | Wada | ........................... | 360/92.1 |
| 6,222,699 B1 * | 4/2001 | Luffel et al. | ................. | 360/92.1 |
| 6,381,089 B1 * | 4/2002 | Helmick et al. | .............. | 360/92.1 |
| 6,552,866 B1 * | 4/2003 | Lechner | .......................... | 360/69 |
| 6,693,758 B2 | 2/2004 | Patterson et al. | | |
| 6,693,759 B2 | 2/2004 | Owens et al. | | |
| 6,922,307 B2 * | 7/2005 | Ostwald et al. | .............. | 360/92.1 |
| 6,943,975 B2 | 9/2005 | Steinhilber | | |
| 6,957,124 B2 * | 10/2005 | Holmquist et al. | ........... | 700/214 |
| 7,054,086 B2 * | 5/2006 | Masuda | ......................... | 360/55 |
| 7,158,326 B2 * | 1/2007 | Hanagata | ........................ | 360/69 |
| 7,328,442 B2 * | 2/2008 | Porter | .......................... | 720/632 |
| 7,349,168 B2 * | 3/2008 | Yasue | .............................. | 360/69 |
| 7,480,111 B2 * | 1/2009 | Ikeuchi et al. | .................. | 360/69 |
| 7,800,860 B2 * | 9/2010 | Steinhilber | ..................... | 360/92.1 |
| 8,046,099 B2 * | 10/2011 | Ishitsuka | ....................... | 700/214 |
| 8,213,108 B2 * | 7/2012 | Noguchi et al. | ............. | 360/92.1 |
| 8,264,790 B2 * | 9/2012 | Aoki | ............................. | 360/92.1 |
| 2004/0081539 A1 * | 4/2004 | Berens | .......................... | 414/267 |

FOREIGN PATENT DOCUMENTS

| | | |
|---|---|---|
| JP | 2908400 B | 4/1999 |
| JP | 2002-197758 A | 7/2002 |
| JP | 2003-109269 A | 4/2003 |
| JP | 2003-115146 A | 4/2003 |

\* cited by examiner

*Primary Examiner* — Brian Miller
(74) *Attorney, Agent, or Firm* — Fujitsu Patent Center (57) ABSTRACT

A library apparatus includes a drive unit for writing data into or reading data from a cartridge, a cell unit having a plurality of cells to store the cartridges and a bottom plate in which a guide groove is formed, a movement unit for moving the cartridge along the guide groove between the cell and the drive unit, the movement unit being arranged under the cell unit, and a control unit for controlling the movement unit to move up through the guide groove, to engage the cartridge, and to move the engaged cartridge.

13 Claims, 10 Drawing Sheets

← FRONT    REAR →

LIBRARY APPARATUS

CROSS-REFERENCE TO RELATED APPLICATIONS

This application is based upon and claims the benefit of priority of the prior Japanese Patent Application No. 2010-012279, filed on Jan. 22, 2010, the entire contents of which are incorporated herein by reference.

FIELD

The embodiments discussed herein are related to a technology for a library apparatus.

BACKGROUND

A library apparatus is well-known as a high capacity external storage device that is connected with a large scale computer. The library apparatus includes a plurality of cartridges, and each of the cartridges stores a tape medium. And the library apparatus moves the cartridge to a tape drive unit by a movement unit such as an accessor or a robot and writes data into or reads data from the tape medium by the tape drive unit. Recently, there is a library apparatus including a plurality of tape drive units or a library apparatus including an optical disk drive unit.

Figure 1A:
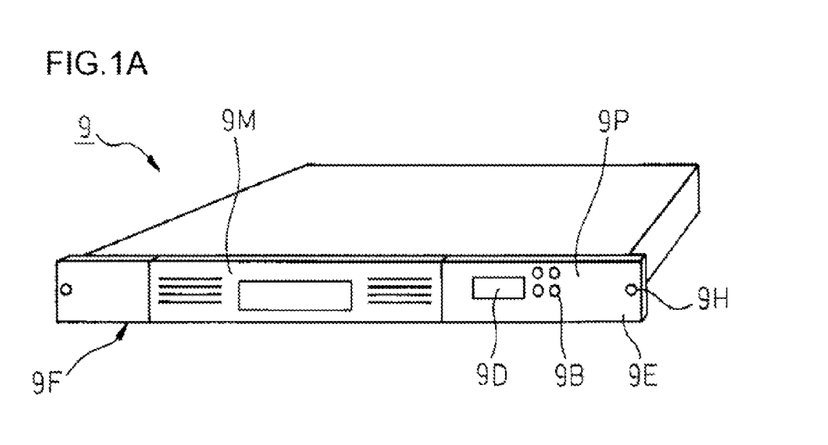
FIGS. 1A to 1C illustrate a perspective view of a conventional library apparatus.
Figure 1B:
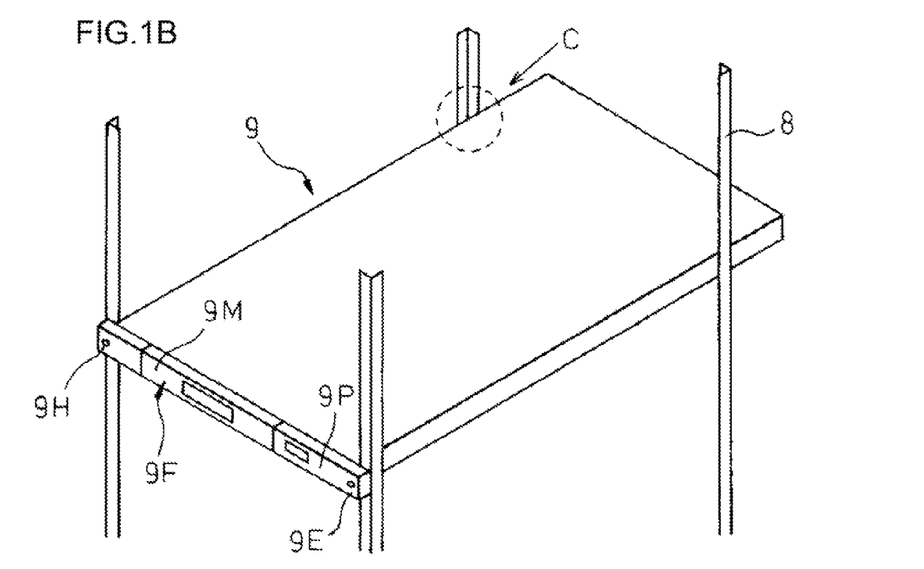
Figure 1C:
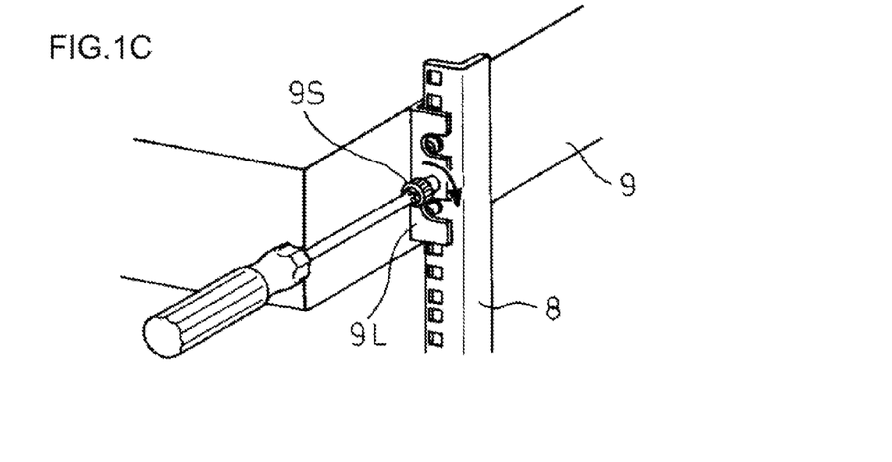

A minimum system of the library apparatus is a library apparatus that includes one tape drive unit that is arranged in a rack space of 1U (44.45 mm) in height. FIGS. 1A to 1C illustrate a perspective view of a conventional library apparatus 9. FIG. 1A illustrates a perspective view of a library apparatus 9 having 1U in height viewed from a front panel 9F side. The front panel 9F includes an operator panel 9P and an opening for a magazine 9M that stores the cartridges. The operator panel 9P includes an operation button 9B and a display unit 9D. The front panel 9F has ear portions 9E extending on both sides, and each of the ear portions 9E has a fixing hole 9H. The library apparatus 9 includes a rear panel (not illustrated) which includes a power receptacle, a power switch and a connector for communication with an external device.

FIG. 1B illustrates a method for mounting and fixing the library apparatus 9 illustrated in FIG. 1A in a rack 8. The rack 8 is a rack of 19 inch size which is a universal pitch of the EIAJ or EIA standard, and a prop of the rack 8 has L-shaped cross-section. The front panel 9F of the library apparatus 9 is fixed to a rack 8 with a screw through the fixing hole 9H formed on the ear portion 9E. Moreover, a back portion of the library apparatus 9 is fixed to the rack 8 with a screw 9S using a L-shaped metal fitting 9L as illustrated in FIG. 1C. When a slide rail is provided on the rack 8, the library apparatus 9 is mounted on the slide rail.

When the cartridge stored in the library apparatus 9 is replaced, the cartridge is not replaced one by one, but it is performed to replace a magazine that stores a plurality of the cartridges (For instance, refer to Japanese Laid-open Patent Publication No. 2003-115146). On the other hand, only one magazine 9M is arranged in the library apparatus 9 of 1U in height illustrated in FIG. 1A.

Figure 2A:
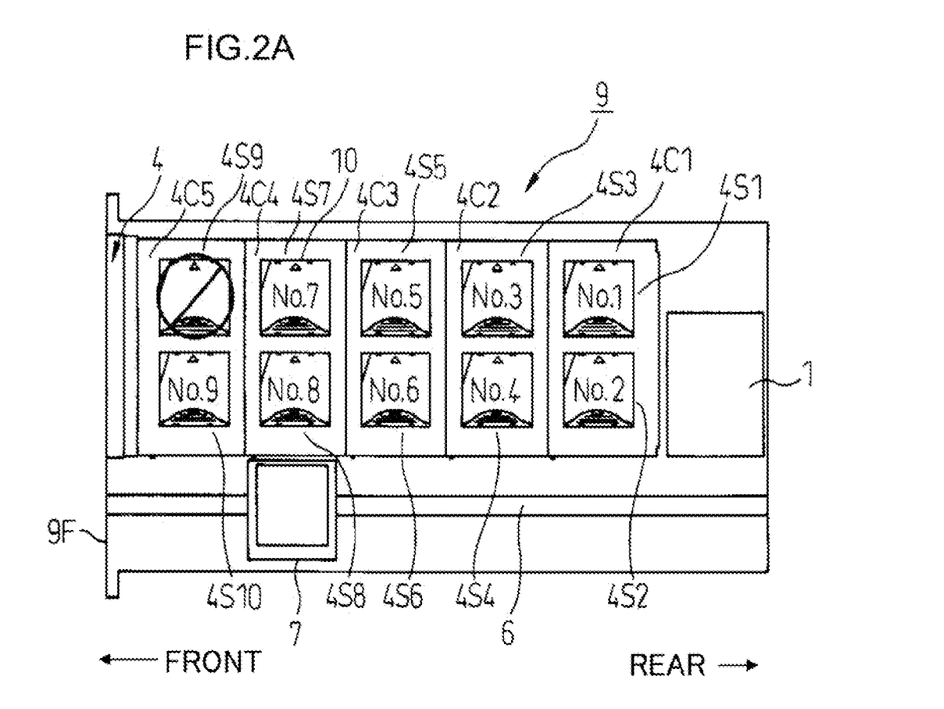
FIG. 2A illustrates an internal structure of the conventional library apparatus.

FIG. 2A illustrates an internal structure of the library apparatus 9 illustrated in FIG. 1A, and there is a front panel 9F at the left side in FIG. 2A. The magazine 4 includes five columns 4C1 to 4C5 in the longitudinal direction (in depth direction) of the magazine 4, and there is space for storing two cartridges 10 in each of columns. This space stores two cartridges 10 in the short side direction (in width direction) of the magazine 4, and a portion where each cartridge 10 is stored is called a slot. Therefore, there are ten slots 4S1 to 4S10 in the magazine 4 inserted in the library apparatus 9. However, since the nearest slot 4S9 to the front panel 9F is a retraction slot, the magazine 4 of the library apparatus 9 stores nine cartridges 10 that is the maximum number of the cartridges.

Moreover, a tape drive unit 1 for recording or reproducing the cartridge 10 is located adjacent to the opposite end of the front panel 9F of the library apparatus 9. Moreover, the rail 6 is provided along in the longitudinal direction of the magazine 4 in the space beside the magazine 4 in the library apparatus 9, and the robot 7 that is the movement unit moves on this rail 6. The robot 7 selects the cartridges 10, which is recorded or reproduced by the tape drive unit 1, from either of the columns 4C1 to 4C5 of magazine 4 and moves it to the tape drive unit 1. FIG. 2A omits illustration of a power supply unit and a control unit.

In this housing, the robot 7 takes out directly the cartridge 10 stored in the slots 4S2, 4S4, 4S6, 4S8 and 4S10 which are adjacent to the rail 6, and the robot 7 moves the cartridge 10 to the tape drive 1. On the other hand, the robot 7 cannot take out directly the cartridge 10 stored in the slots 4S1, 4S3, 4S5 and 4S7 on the side far from the rail 6. When the cartridge 10 stored in the slots 4S1, 4S3, 4S5, and 4S7 is moved to the tape drive 1, the retraction slot 4S9 is used.

Hereinafter, an example that the No. 5 cartridge 10 stored in the slot 4S5 is moved to the tape drive unit 1 is described. In this housing, first of all, as the robot 7 takes out the No. 9 cartridge 10 stored in the slot 4S10 and stores into the retraction slot 4S9 to empty the slot 4S10. Next, the robot 7 takes out the No. 6 cartridge 10 from the slot 4S6, and moves the cartridge 10 to the empty slot 4S10. After this operation, the robot 7 takes out the No. 5 cartridge 10 stored in the slot 4S5 in the column 4C3, and moves it to the tape drive unit 1.

Figure 2B:
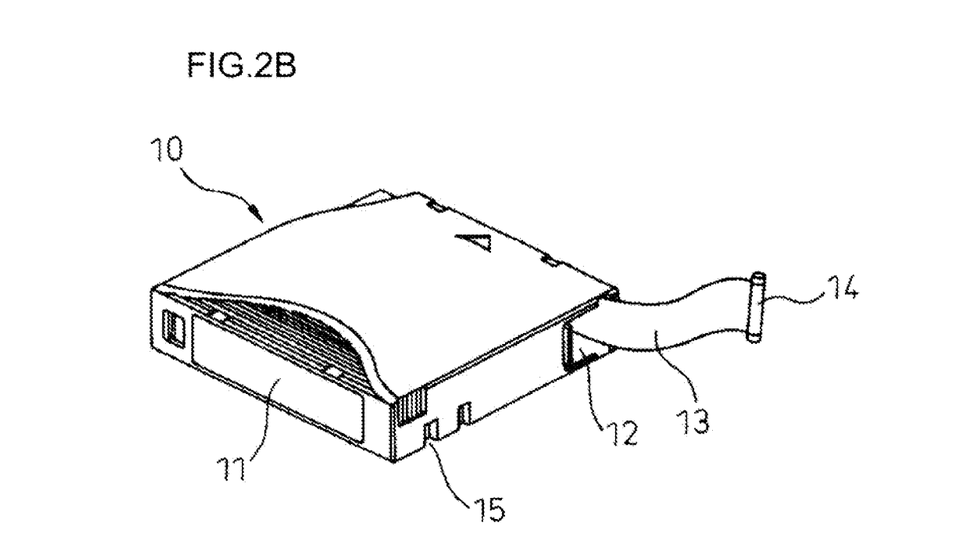
FIG. 2B illustrates an example of a cartridge.

FIG. 2B illustrates an example of the cartridge 10 used in the library apparatus 9. The cartridge 10 used in the library apparatus 9 is called LTO (Linear Tape Open) cartridge. And the cartridge 10 has a structure that a magnetic tape 13 is pulled out from an opening 12 by a leader pin 14. The opening 12 is provided on the side of the cartridge 10. The cartridge 10 has a storage capacity of between 100 GB and 800 GB, depending on a specification. Besides the opening 12, there are an identification label sticking area 11 and a recess 15 on the side of the cartridge 10. The recess 15 is provided to be inserted by a picker of the robot 7 described later. The bar code label on which the bar code is printed, for instance, is stuck on the identification label sticking area 11. Moreover, a reel for winding the magnetic tape 13 is exposed on the bottom of the cartridge 10.

Japanese Laid-open Patent Publication No. 2003-115146 is an example of conventional technique.

However, in the library apparatus of 1U in height illustrated in FIG. 2A, the magazine and the movement area of the robot are deposited in an area other than the tape drive, the power supply unit and the control unit. Since the cartridges are not stored in the movement area of the robot, the storage efficiency of the cartridges is bad. That is, the maximum storage volumes of the cartridges in the library apparatus of 1U in height illustrated in FIG. 2A are nine volumes.

SUMMARY

According to an aspect of the invention, a library apparatus includes a drive unit for writing data into or reading data from a cartridge, a cell unit having a plurality of cells to store the cartridges and a bottom plate in which a guide groove is formed, a movement unit for moving the cartridge along the guide groove between the cell and the drive unit, the movement unit being arranged under the cell unit, and a control unit for controlling the movement unit to move up through the guide groove, to engage the cartridge, and to move the engaged cartridge.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a library apparatus according to an embodiment is described in detail with reference to the accompanying drawings. For a power supply unit 2 and a cartridge 10, the same reference numerals as those in FIG. 2 are given to describe the embodiment.

Figure 3A:
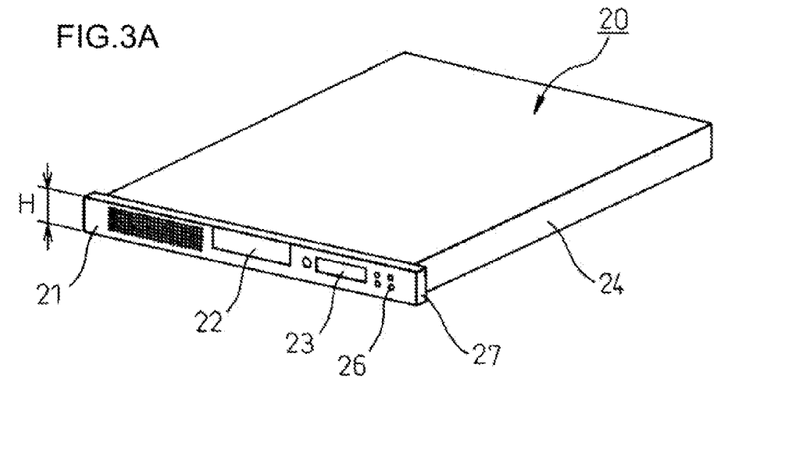
FIGS. 3A to 3C schematically illustrate a library apparatus according to a first embodiment.

FIGS. 3A to 3C schematically illustrate a library apparatus 20 according to a first embodiment. FIG. 3A illustrates a perspective view of the library apparatus 20. The library apparatus 20 of the embodiment has the size that can be mounted in a 1U rack space. The height H of the library apparatus 20 is 44 mm. A front panel 21 of the library apparatus 20 has a cartridge inlet/outlet port 22 for inserting and ejecting the cartridge 10, a display 23, and an operation button 26. The ear portions 27 to mount the library apparatus 20 in a rack (not illustrated in FIG. 3A) are located at both sides of the front panel 21. A reference numeral 24 indicates a housing cover. Moreover, the library apparatus 20 includes a back panel which includes a power receptacle, a power switch and a connector for communication with an external device (not illustrated in FIG. 3A).

Figure 3B:
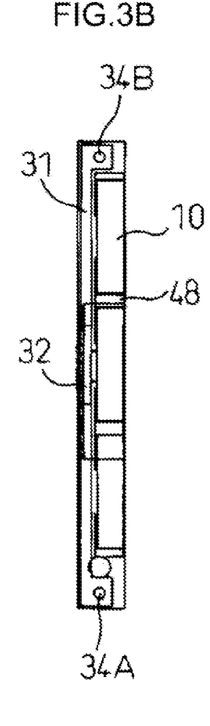
Figure 3C:
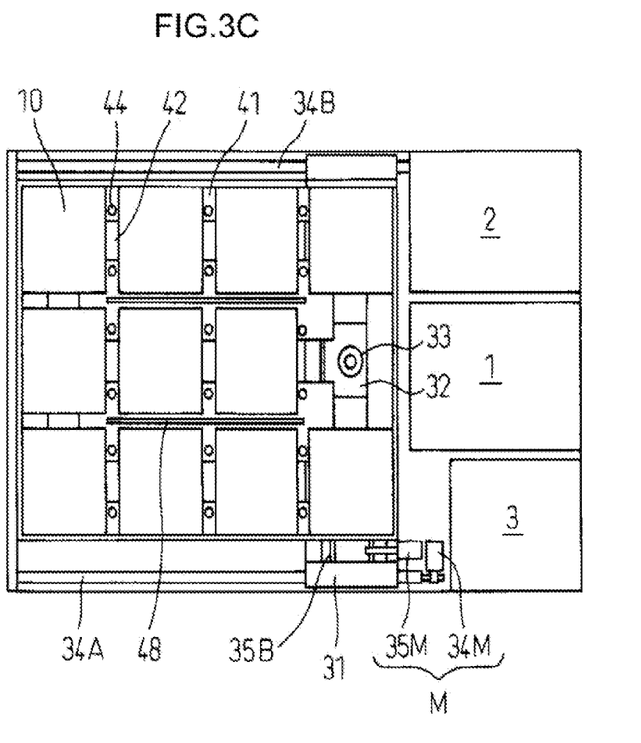
Figure 4:
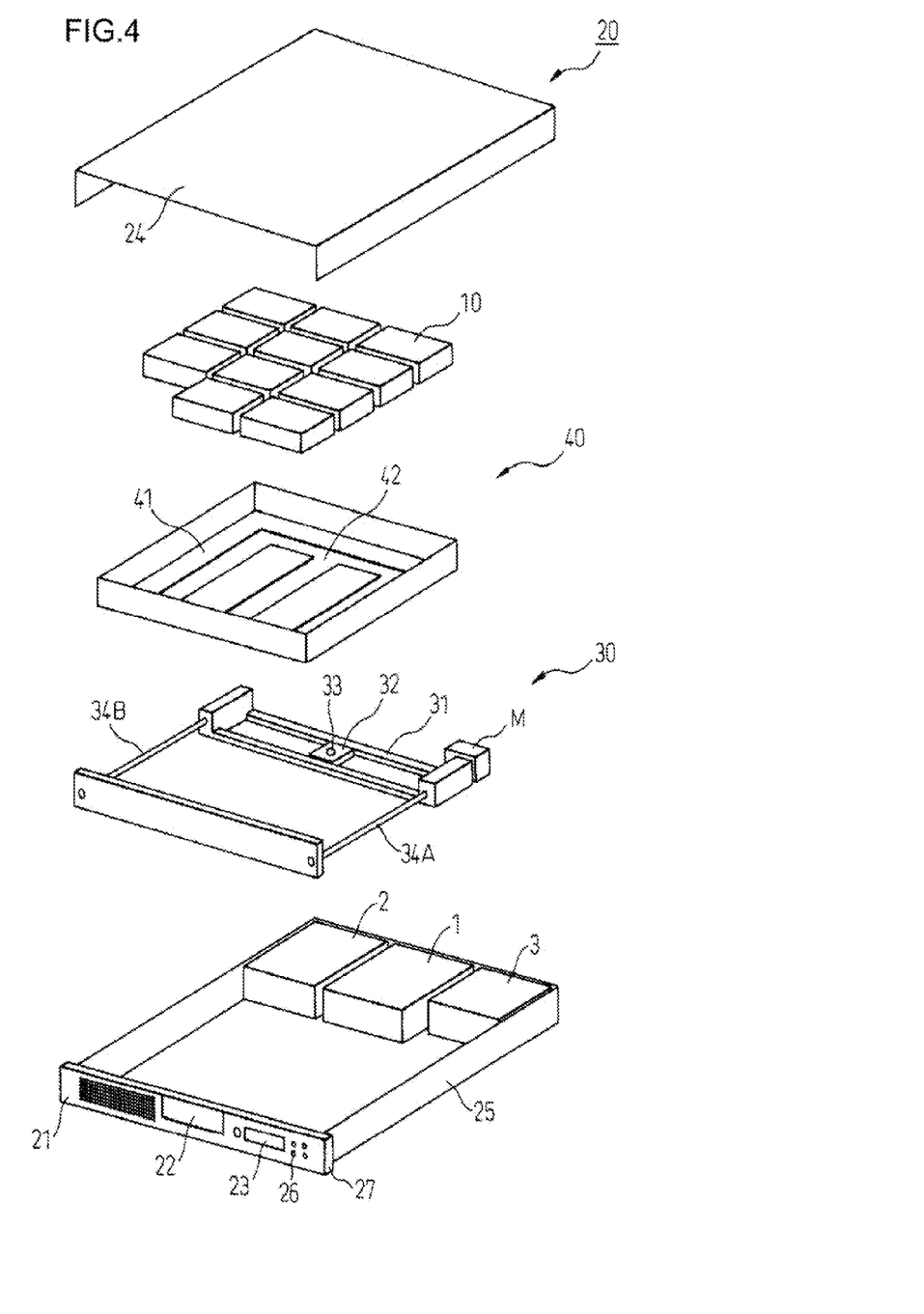
FIG. 4 illustrates an exploded perspective view of the library apparatus.

FIGS. 3B to 3C illustrate an internal structure of the library apparatus 20 illustrated in FIG. 3A. FIG. 3B illustrates a cross-sectional view of library apparatus 20. FIG. 3C illustrates a transparent plan view of library apparatus 20. Moreover, FIG. 4 illustrates an exploded perspective view of the library apparatus 20 in FIG. 3A. The housing of the library apparatus 20 includes the front panel 21, a base housing 25 coupled with the front panel 21 and a cover 24 that covers the base housing 25. A tape drive unit 1, the power supply unit 2 and a control unit 3 are arranged on the side far from the front panel 21 coupled with the base housing 25.

The tape drive unit 1 writes data into or read data from the cartridge 10 inserted into the library apparatus 20. The data read from the cartridge 10 by the tape drive unit 1 is transmitted directly to the external device. The data received directly from the external device is written into the cartridge by the tape drive unit 1. The power supply unit 2 reduces a voltage of a power source supplied from an external commercial power source. The power supply unit 2 provides each unit of the library apparatus with the reduced voltage, or converts the reduced voltage into a current to provide each unit with the current. The control unit 3 controls to move a robot described later.

In an area in the base housing 25 other than areas where the tape drive unit 1, the power supply unit 2 and the control unit 3 are arranged, the cartridge movement unit (hereinafter called "robot") 30 is arranged on the bottom plate of the base housing 25. A cell unit 40 is arranged on the robot 30. The cartridges 10 are arranged side-by-side in the cell unit 40. The cell unit 40 is described later in detail. The cell unit 40 is suspended from a member such as the cover 24 that is arranged on the cell unit 40 using a suspension member, and the cell unit 40 is fixed in the housing of the library apparatus 20. Moreover, reference letter M in FIG. 3C and reference letter M in FIG. 4 denote the driving mechanism of the robot 30. The driving mechanism M is described later.

Figure 6A:
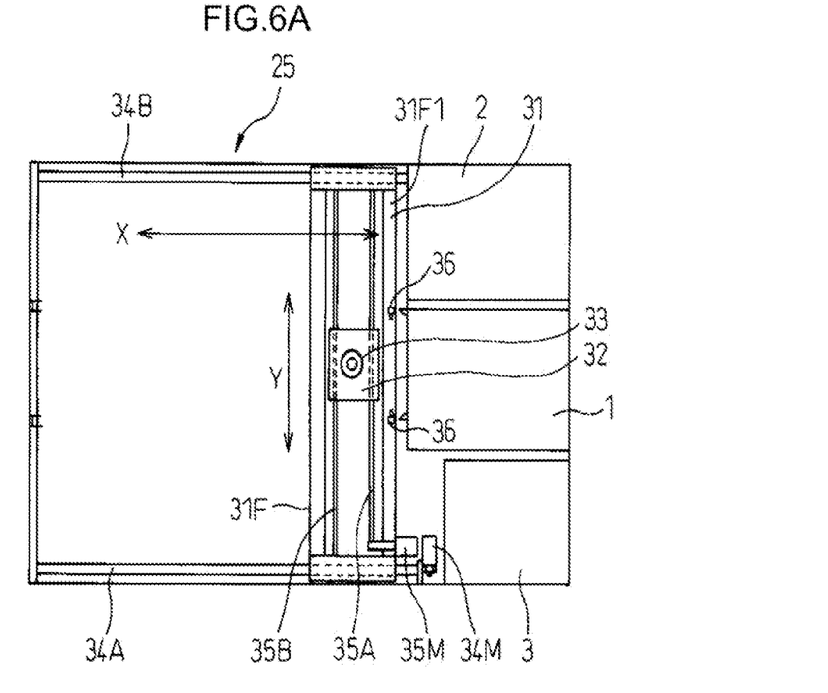
FIGS. 6A to 6B illustrate a detailed structure of a robot.
Figure 6B:
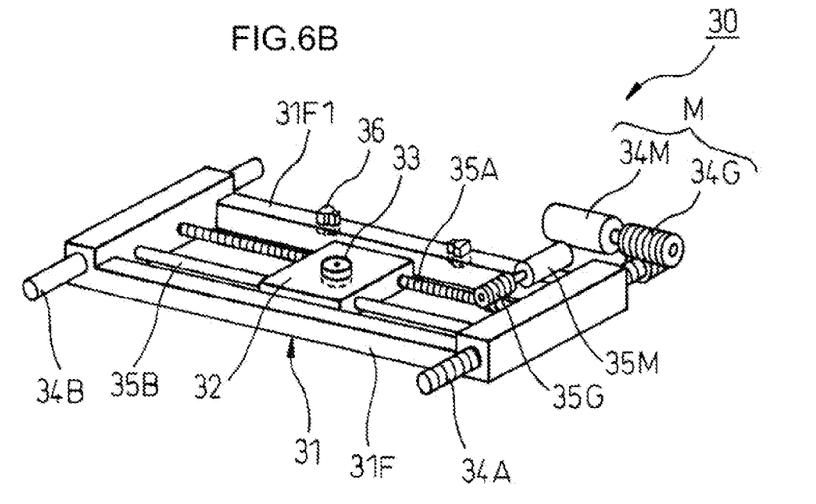

The structure of the robot 30 is illustrated schematically in FIG. 4, and FIGS. 6A to 6B illustrate a detailed structure of the robot 30. The structure of the robot 30 is described in detail with reference to FIGS. 6A and 6B. The robot 30 includes a first base (hereinafter called X base), which is movable in depth direction (denoted as X direction in FIG. 6A) of the base housing 25 and a second base (hereinafter called Y base), which is movable in left-right direction (denoted as Y direction in FIG. 6A) of the base housing 25. The X base 31 is a rectangular flame 31F and the Y base 32 moves in the rectangular flame 31F. The depth direction and the width direction are the directions seen from the front panel 21 side.

A sliding screw shaft 34A and a guide shaft 34B for moving the X base 31 in X direction are mounted in parallel on both sides of the base housing 25. One end of the X base 31 screws with the sliding screw shaft 34A, and the other end of the X base 31 is penetrated by the guide shaft 34B. The sliding screw shaft 34A is rotated by a motor 34M, which is mounted near the control unit 3, and moves the X base 31 in X direction. Moreover, a sliding screw shaft 35A and a guide shaft 35B for moving the Y base 32 in Y direction are mounted on the rectangular frame 31F of the X base 31. One end of the Y base 32 screws with the sliding screw shaft 35A and the other end of the Y base 32 is penetrated by the guide shaft 35B. The sliding screw shaft 35A is rotated by a motor 35M, which is mounted on the rectangular frame 31F, and moves the Y base 32 in Y direction. Each of the motor 34M and the motor 35M is corresponding to a driving mechanism M illustrated in FIG. 4.

A picker 36 is mounted on the frame 31F1 of the X base 31 near the tape drive unit 1. The picker 36 inserts the cartridge into the tape drive unit 1 or ejects the cartridge from the tape drive unit 1. The picker 36 is described later. Moreover, a clutch 33 protrudes from the top of the Y base 32, and engages with a reel exposed on the bottom of the cartridge 10. The clutch 33 moves up from the top of the Y base 32 and moves down to the top of the Y base 32.

Figure 5A:
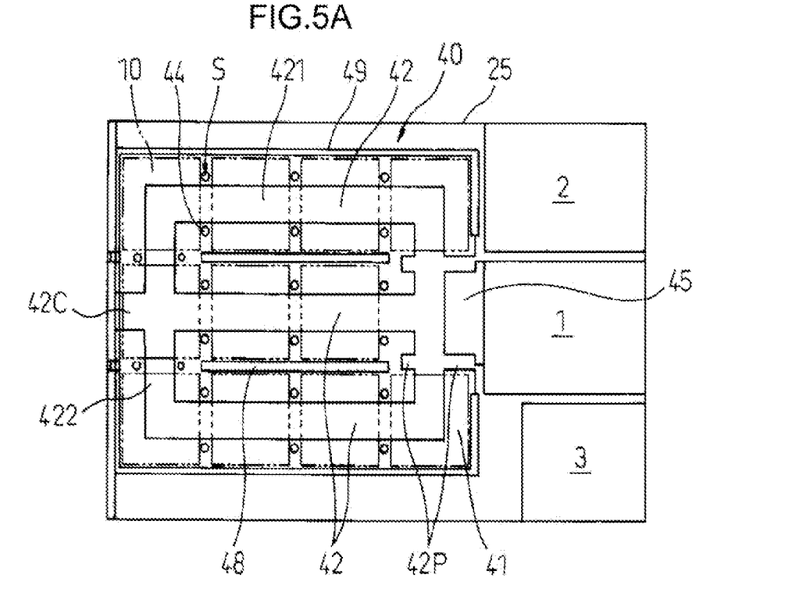
FIGS. 5A to 5B illustrate a detailed structure of a cell unit.
Figure 5B:
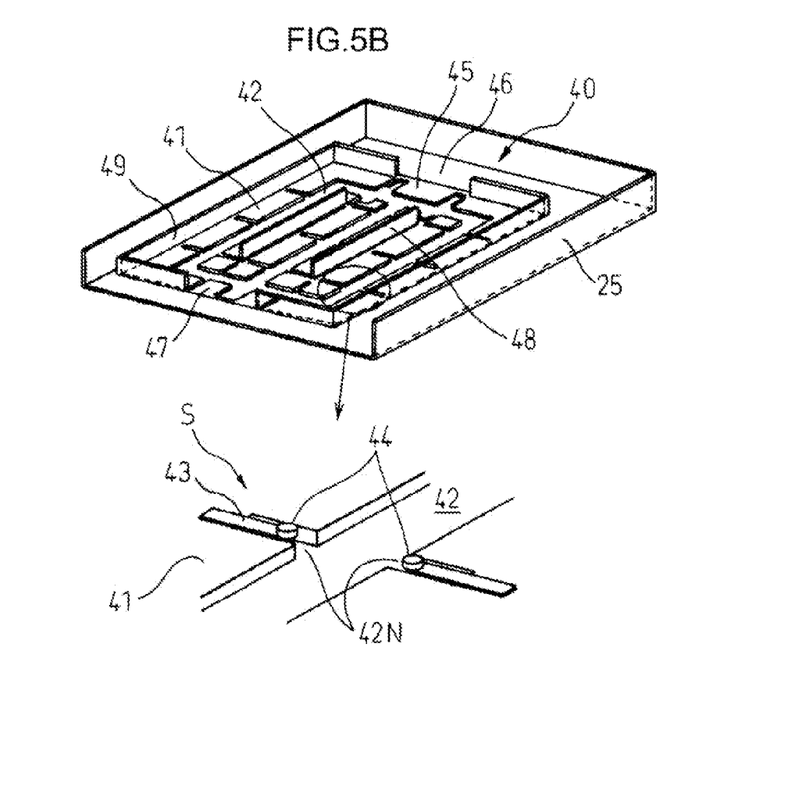

The structure of the cell unit 40 is illustrated schematically in FIG. 4, and FIGS. 5A and 5B illustrate a detailed structure of the cell unit 40. The structure of the cell unit 40 is described in detail with reference to FIGS. 5A and 5B. The cell unit 40 includes a bottom plate 41 which stores side-by-side three cartridges 10 in width direction of the cell unit 40 and four cartridges 10 in depth direction of the cell unit 40. An each portion of the bottom plate in which a cartridge 10 is stored is called a cell. The cell unit 40 has 12 cells. A surrounding wall 49 is provided to surround the bottom plate 41. The surrounding wall 49 has an inserting/ejecting port 46 of the cartridge 10 at the side opposing the tape drive unit 1 and has an inserting/ejecting port 47 of the cartridge 10 at the side opposing the front panel 21. Moreover, a guide groove 42 is a hole made on the bottom plate 41. The guide groove 42 allows the robot 30 (refer to FIG. 4) to move the cartridge 10 which is stored in the cell unit 40. The guide groove 42 includes first guide grooves 421 and a second guide grooves 422. The first guide grooves 421 extend in three rows in depth direction of the cell unit 40. The second guide grooves 422 connect both sides of the first guide grooves 421 in left-right direction of the base housing 25.

Moreover, a guide 45 and a groove 42P are provided near the cartridge inserting/ejecting port 46 of the cell unit 40. The guide 45 is used for smoothly inserting the cartridge 10 into or ejecting the cartridge 10 from the tape drive unit 1. The groove 42P allows the picker 36, which is described in FIGS. 6A and 6B, to move. In addition, a groove 42C is provided near the cartridge inserting/ejecting port 47. The groove 42C is used when the cartridge 10 is inserted into or ejected from a cartridge inserting/ejecting port of the front panel 21 (not illustrated in FIGS. 5A and 5B).

A lock mechanism S prevents natural movement in the front and back direction and left-right direction of the cartridge 10 that is inserted in the cell unit 40. The latch mechanism S is provided in the area on the bottom plate 41 of the cell unit 40 located between the areas that the cartridges 10 are stored. The lock mechanism S is that one end of a plate spring is fixed with the bottom plate 41 and a locking projection 44, as one example of a locking member, is mounted on the other free end of the plate spring. A retraction groove 42N is provided on the bottom plate 41 at the side opposing the locking projection 44. The locking projection 44 is in a dome shape, and is made of a material such as resin. The locking projection 44 projects from the bottom plate 41 unless external force acts on the locking projection 44, and prevents the cartridge 10 from being moved. On the other hand, when the cartridge 10 is moved by the robot 30 illustrated in FIG. 4, the cartridge 10 rides on the locking projection 44 in a dome shape. Thereby, the locking projection 44 inflects the plate spring 43 to push the plate spring 43 into the retraction groove 42N, and allows the cartridges to move.

A supporting wall 48 to suspend the cell unit 40 from the upper side is provided in the area of the bottom plate 41 located between first guide grooves 421 in the cell unit 40 of this embodiment. For instance, the supporting wall 48 may be suspended from the cover. Moreover, the cell unit 40 may be suspended from the upper side by another member instead of the supporting wall 48. Thus, when the cell unit 40 is suspended from the upper side by the supporting wall 48 provided in the area of the bottom plate 41 located between first guide grooves 421, the cartridge 10 which is stored in the cell unit 40 and the robot located under the cell unit 40 are not prevented from moving. In addition, it is also possible to support the cell unit 40 from the side of the housing.

FIG. 3B and FIG. 3C illustrate a cross-sectional view and a plan view of the library apparatus 20. The library apparatus 20 includes the tapes drive unit 1, the power supply unit 2, the control unit 3, the robot 30 that is described with reference to FIGS. 4 to 6 and the cell unit 40 that stores the cartridges 10. FIG. 3B and FIG. 3C illustrate the positional relation between the robot 30 and the cell unit 40 in the library apparatus 20.

Figure 7A:
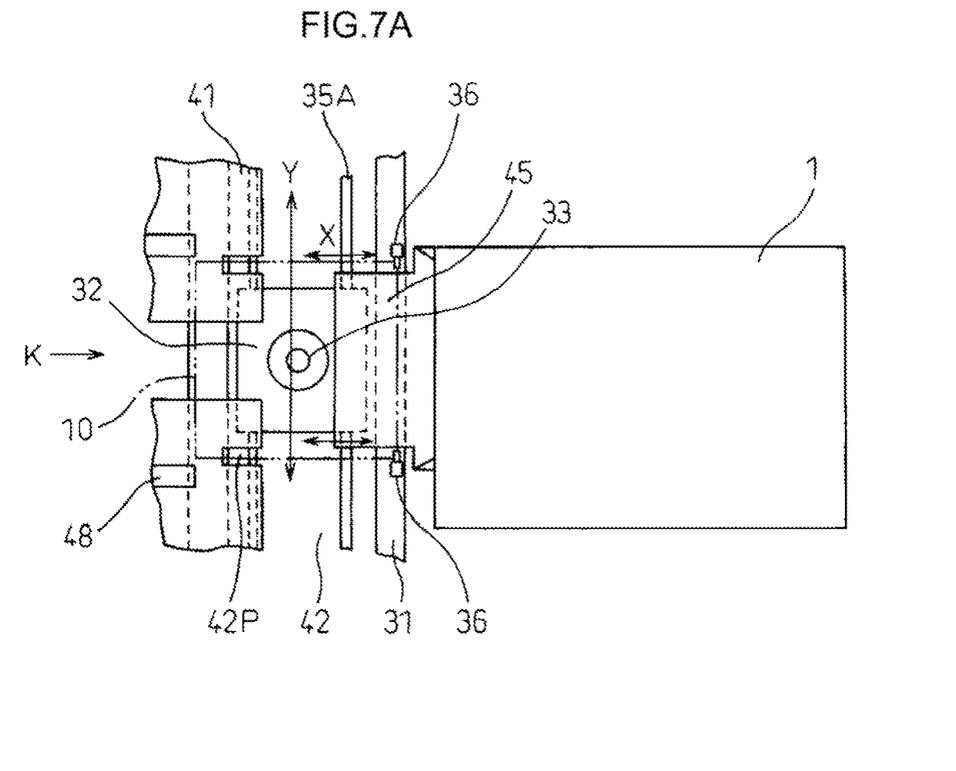
FIGS. 7A to 7B illustrate a sectional view of the robot.
Figure 7B:
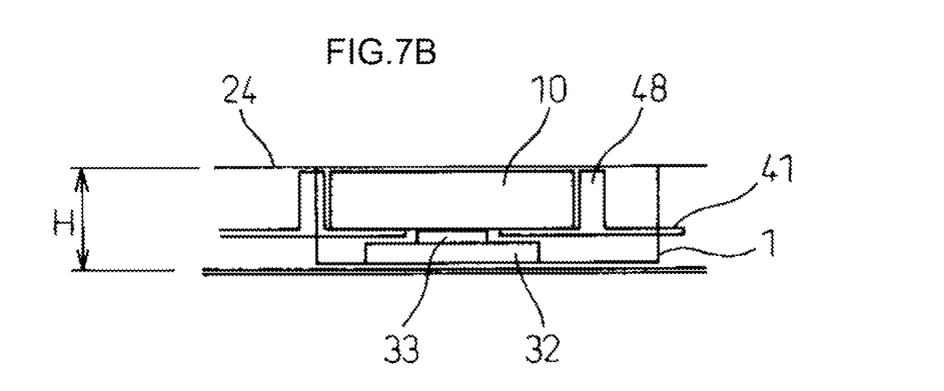

FIGS. 7A to 7B illustrate a sectional view of the robot 30. FIG. 7A illustrates an enlarged sectional view of the robot 30 illustrated in FIG. 6A. FIG. 7B is a view that the robot 30 illustrated in FIG. 7A is viewed from the direction of arrow K illustrated in FIG. 6A. The X base 31 moves in the direction of arrow X, and the Y base 32 moves in the direction of arrow Y, thereby the X base 31 and the Y base 32 move the cartridge 10 that data is to be read from or written into by the tape drive unit 1 to a position in front of the tape drive unit 1. The vertically movable picker 36, which is provided on the rectangular frame 31F of the X base 31 near the tape drive unit 1, is usually positioned under the bottom plate 41 of the cell unit 40. Thereby, the Y base 32 is not prevented from moving. When the cartridge 10 is moved by the Y base 32 to the position in front of the tape drive unit 1, the picker 36 moves up to insert the cartridge 10 into the tape drive unit 1. Moreover when the data is read from or written into the cartridge 10, the picker 36 moves up to eject the cartridge 10 from the tape drive unit 1.

The front end of the picker 36 that has moved up vertically enters into a recess 15 provided on both sides of the cartridge 10 illustrated in FIG. 2B, and the picker 36 moves the cartridge 10. The groove 42P for the picker 36 illustrated in FIG. 7A is provided so that the picker 36 that has moved up vertically enters into the recess 15 of the cartridge 10. Moreover, the guide 45 allows the picker 36 to insert the cartridge 10 into the tape drive unit 1 smoothly. Moreover, the supporting wall 48 that projects from the bottom plate 41 of the cell unit 40 reaches the cover 24 of the library apparatus 20, and is fixed to the cover 24 to suspend the cell unit 40. Moreover, when the Y base 32 moves the cartridge 10, the clutch 33 moves up from the Y base 32 and engages the reel of the cartridge 10. The guide groove 42 formed in the bottom plate 41 of the cell unit 40 is the hole through which the clutch 33 passes.

Figure 8A:
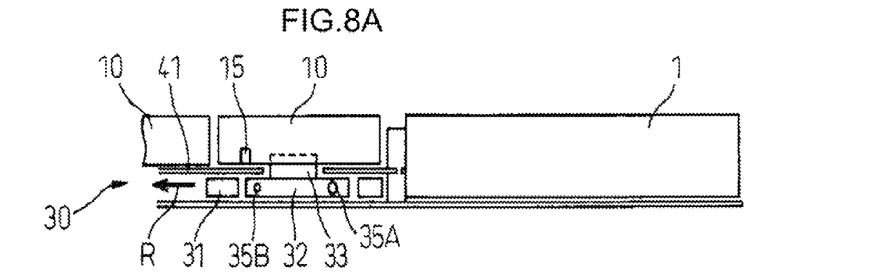
FIGS. 8A to 8E illustrate a processing procedure that the robot inserts the cartridge into a tape drive unit and ejects the cartridge from the tape drive unit.
Figure 8B:
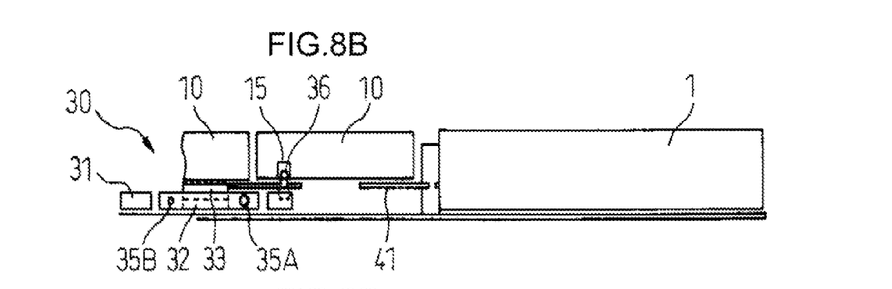

FIGS. 8A to 8E illustrate a processing procedure that the robot 30 of the library apparatus 20 of the embodiment inserts the cartridge 10 into the tape drive unit 1 and ejects the cartridge 10 from the tape drive unit 1. FIG. 8A illustrates a condition that the robot 30 moves the cartridge 10 to the position in front of the tape drive unit 1. Under this condition, the clutch 33 moves up from the Y base 32 and engages with the reel of the cartridge 10. When the robot 30 completes moving the cartridge 10 to the position in front of the tape drive unit 1, the clutch 33 moves down, and the robot 30 is disengaged from the cartridge 10. Under this condition, the robot 30 moves in the direction of arrow R and stops at the position that the picker 36 has arrived directly under the recess 15 of the cartridge 10 as illustrated in FIG. 8B.

Figure 8C:
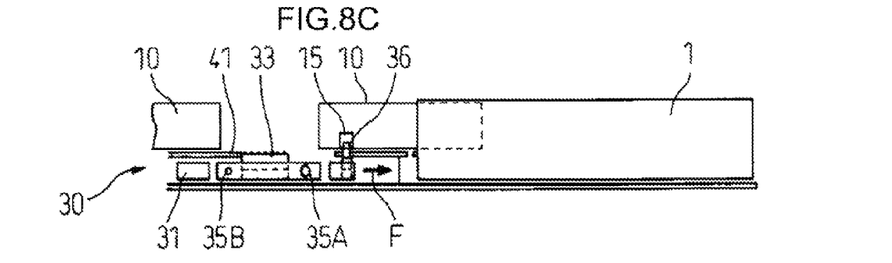
Figure 8D:
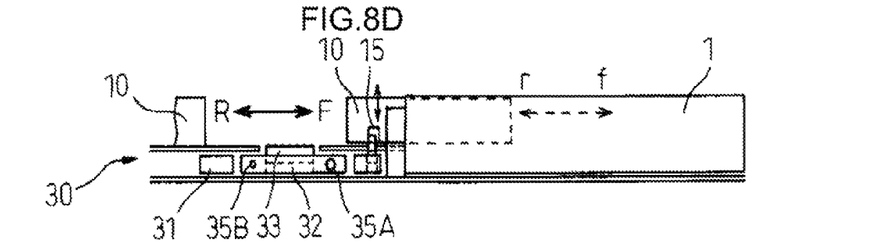

When the picker 36 arrives directly under the recess 15 of the cartridge 10, the picker 36 moves up, and the front end of the picker 36 engages the recess 15 of the cartridge 10. When the front end of the picker 36 engages with the recess 15 of the cartridge 10, the robot 30 moves in the direction of arrow F as illustrated in FIG. 8C, and the cartridge 10 is inserted into the tape drive 1 by using the picker 36. When the robot 30 is incapable of moving in the direction of arrow F, the robot 30 stops inserting the cartridge 10 into the tape drive unit 1. FIG. 8D illustrates this state.

When the cartridge 10 is moved to the position illustrated in FIG. 8D by the picker 36, the picker 36 moves down, and the picker 36 is disengaged from the cartridge 10. Afterward, the cartridge 10 is moved in the direction of arrow F by the movement unit of the tape drive unit 1, and it is completed to insert the cartridge 10 into the tape drive unit 1. When the insertion of the cartridge 10 into the tape drive unit 1 is completed, the magnetic tape that is built into the cartridge 10 is drawn out, and data is written into the magnetic tape or data is read from the magnetic tape.

Figure 8E:
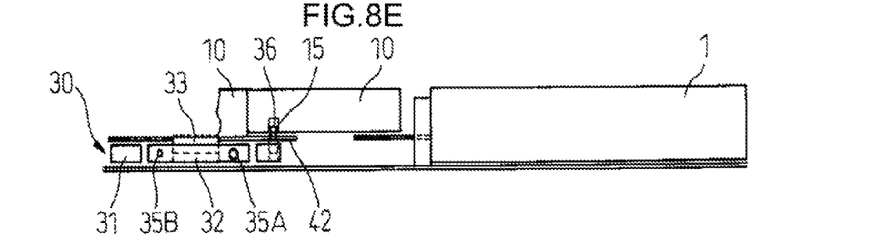

When reading data from or writing data into the magnetic tape is completed, the magnetic tape is returned to the cartridge 10. And then, as the cartridge 10 is moved in the direction of arrow R by the movement unit of the tape drive unit 1, the cartridge 10 is returned to the position illustrated in FIG. 8D. This position is the same position as the position that the insertion of cartridge 10 into tape drive unit 1 using the picker 36 is completed. Therefore, the picker 36 moves up again at this position, and the front end of the picker 36 engages with the recess 15 of the cartridge 10. When the front end of the picker 36 engages with the recess 15 of the cartridge 10, the robot 30 moves in the direction of arrow R, and the cartridge 10 is ejected from the tape drive unit 1 by the picker 36 as illustrated in FIG. 8E.

When the picker 36 arrives at the end of the groove 42P for the picker 36 as illustrated in FIG. 7A, the robot 30 stops ejecting the cartridge 10 from the tape drive unit 1 by the picker 36. The picker 36 moves down at this position, and the picker 36 is disengaged from the cartridge 10. Afterward, when the robot 30 moves in the direction of arrow F and the clutch 33 arrives at directly under the reel of cartridge 10, the robots 30 stops. And, when the clutch 33 moves up from the Y base 32, the robot 30 engages with the cartridge 10. FIG. 8A illustrates this state. And, the cartridge 10 that writing data into or reading from the magnetic tape is completed is moved by the robot 30. The next cartridge 10 that is writing data into or reading from the magnetic tape is moved to this position.

The robot 30 of the library apparatus 20 can insert the cartridge 10 into tape drive unit 1 or eject the cartridge 10 from the tape drive unit 1 in this embodiment as described above.

Figure 9A:
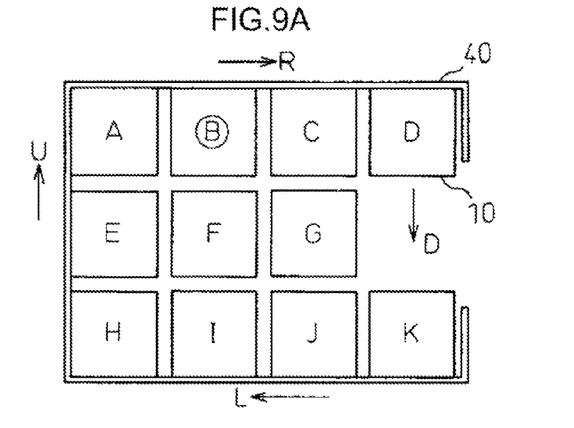
FIGS. 9A to 9J illustrate a processing procedure for moving the cartridge in front of the tape drive unit.

Next, the movement operation of the cartridge 10 in the cell unit 40 using the robot 30 is described as follows. FIGS. 9A to 9J illustrate a processing procedure for moving the cartridge 10 in front of a tape drive unit 1. Here, the reference letters of A to K are used for eleven cartridges 10 as illustrated in FIG. 9A. When the cartridge 10 with reference letter B (hereinafter called "cartridge B") is the next cartridge that data is written into or read from, the movement operation of the cartridges A to K is described as follows. Assume that there is one free space corresponding to one cartridge 10 in front of the tape drive unit 1. When the number of free spaces is only one free space corresponding to one cartridge, the number of the cartridges 10 in the cell unit 40 becomes the maximum. However the number of free spaces may be more than one.

If the cartridge B is the next cartridge that data is written into or read from as illustrated in FIG. 9A, the next cartridge B is moved in front of the tape drive unit 1 according to following procedures (1) to (9).

Figure 9B:
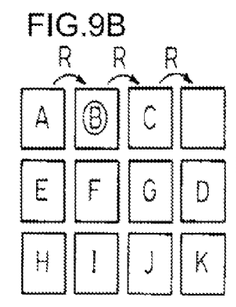

(1) When the robot 30 moves the cartridge D in the direction of arrow D as illustrated in FIG. 9A, this operation results in the state of FIG. 9B.

(2) In the direction of arrow R as illustrated in FIG. 9B, the robot 30 moves the cartridge C to the free space obtained by moving the cartridge D, and then moves the cartridge B to the free space obtained by moving the cartridge C, and then moves the cartridge A to the free space obtained by moving the cartridge B. These operations result in the state of FIG. 9C.

Figure 9C:
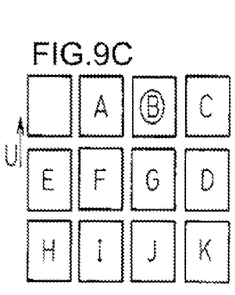
Figure 9D:
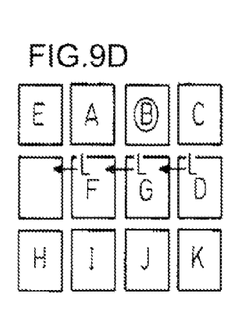

(3) When the robot 30 moves the cartridge E in the direction of arrow U as illustrated in FIG. 9C, this operation results in the state of FIG. 9D.

(4) In the direction of arrow L as illustrated in FIG. 9D, the robot 30 moves the cartridge F to the free space obtained by moving the cartridge E, and then moves the cartridge G to the free space obtained by moving the cartridge F, and then moves the cartridge D to the free space obtained by moving the cartridge G. These operations result in the state of FIG. 9E.

Figure 9E:
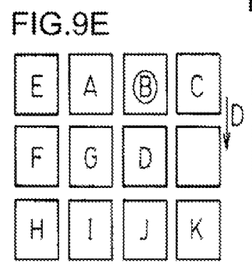
Figure 9F:
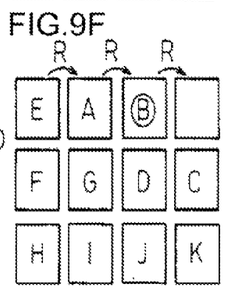

(5) When the robot 30 moves the cartridge C in the direction of arrow D as illustrated in FIG. 9E, this operation results in the state of FIG. 9F.

(6) In the direction of arrow R as illustrated in FIG. 9F, the robot 30 moves the cartridge B to the free space obtained by moving the cartridge C, and then moves the cartridge A to the free space obtained by moving the cartridge B, and then moves the cartridge E to the free space obtained by moving the cartridge A. These operations result in the state of FIG. 9G.

Figure 9G:
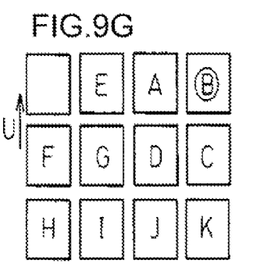
Figure 9H:
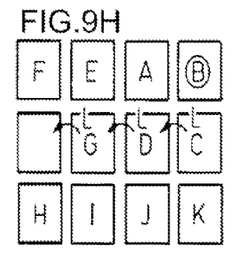

(7) The robot 30 moves the cartridge F in the direction of arrow U as illustrated in FIG. 9G, and this operation results in the state of FIG. 9H.

(8) In the direction of arrow L as illustrated in FIG. 9H, the robot 30 moves the cartridge G to the free space obtained by moving the cartridge F, and then moves the cartridge D to the free space obtained by moving the cartridge G, and then moves the cartridge C to the free space obtained by moving the cartridge D. These operations result in the state of FIG. 9I.

Figure 9I:
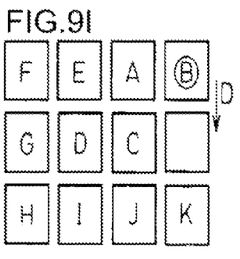
Figure 9J:
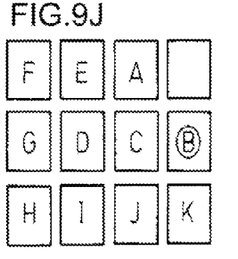

(9) In this state of FIG. 9I, when the robot 30 moves the cartridge B in the direction of arrow D as illustrated in FIG. 9I, this operation results in the state of FIG. 9I Thus, the robot 30 can move the cartridge B to a position at which the cartridge B is inserted into the tape drive unit 1.

Thus, in this embodiment described above, by sequentially sliding the eleven cartridges 10, which are stored in the cell unit 40, the robot 30 can move the cartridge 10 which is located at any position in front of the tape drive unit 1. The control unit 3 illustrated in FIG. 3C performs to move a next cartridge that data is written into or read from to the tape drive unit 1. In the embodiment described above, as illustrated in FIG. 5A, the guide groove 42 formed in the bottom plate 41 of the cell unit 40 includes the first guide grooves 421 and the second guide grooves 422. The first guide grooves 421 extend in three rows in depth direction of the base housing 25. The second guide grooves 422 connect both sides of the first guide grooves 421 in left-right direction of the base housing 25. In another embodiment, as illustrated in FIG. 10A, two third guide grooves 423 may be further provided in area between the two second guide grooves 422.

Figure 10A:
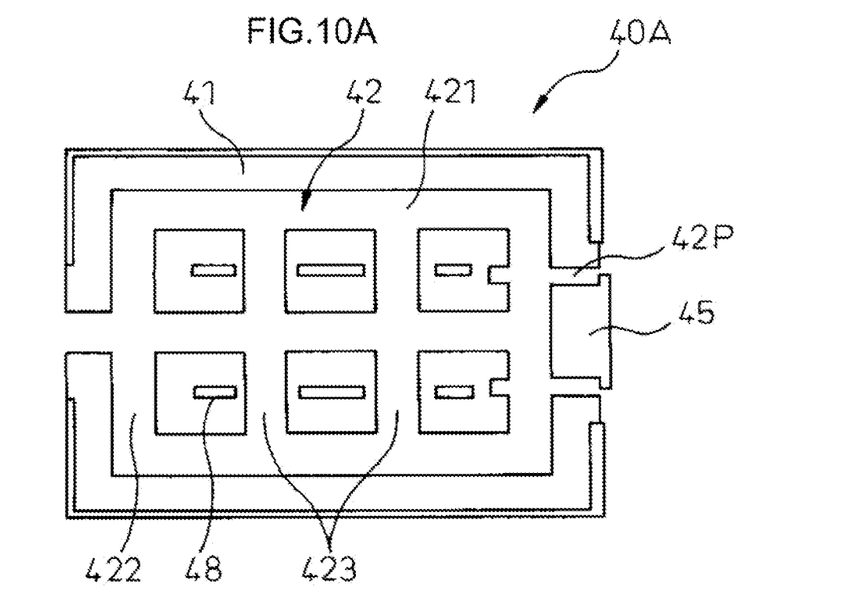
FIG. 10A illustrates a cell unit of a library apparatus according to a second embodiment.

In accordance with an alternative embodiment as illustrated in FIG. 10A, the cartridges B, F, I illustrated in FIG. 9A and the cartridges C, G, J illustrated in FIG. 9A can be moved in the direction of arrow D illustrated in FIG. 9A or in the direction of arrow U illustrated in FIG. 9A with using the two third guide grooves 423. Therefore, in the alternative embodiment as illustrated in FIG. 10A, when the robot 30 moves the cartridge B illustrated in FIG. 9A in front of the tape drive unit 1, the robot 30 can move the cartridge B in front of the tape drive unit 1 according to the following procedures (A) to (I), though illustration is omitted.

(A) The robot 30 moves the cartridge D illustrated in FIG. 9A in the direction of arrow D illustrated in FIG. 9A.

(B) In the direction of arrow R as illustrated in FIG. 9A, the robot 30 moves the cartridge C to the free space obtained by moving the cartridge D, and then moves the cartridge B to the free space obtained by moving the cartridge C.

(C) In the direction of arrow U as illustrated in FIG. 9A, the robot 30 moves the cartridge F to the free space obtained by moving the cartridge B.

(D) In the direction of arrow L as illustrated in FIG. 9A, the robot 30 moves the cartridge G to the free space obtained by moving the cartridge F, and then moves the cartridge D to the free space obtained by moving the cartridge G.

(E) In the direction of arrow D as illustrated in FIG. 9A, the robot 30 moves the cartridge C to the free space obtained by moving the cartridge D.

(F) In the direction of arrow R as illustrated in FIG. 9A, the robot 30 moves the cartridge B to the free space obtained by moving the cartridge C, and then moves the cartridge F to the free space obtained by moving the cartridge B.

(G) In the direction of arrow U as illustrated in FIG. 9A, the robot 30 moves the cartridge G to the free space obtained by moving the cartridge F.

(H) In the direction of arrow L as illustrated in FIG. 9A, the robot 30 moves the cartridge D to the free space obtained by moving the cartridge G, and then moves the cartridge C to the free space obtained by moving the cartridge D.

(I) In the direction of arrow D as illustrated in FIG. 9A, the robot 30 moves the cartridge B to the free space obtained by moving the cartridge C. Thereby, the cartridge B arrives at a position that the cartridge B can be inserted into the tape drive unit 1.

Figure 10B:
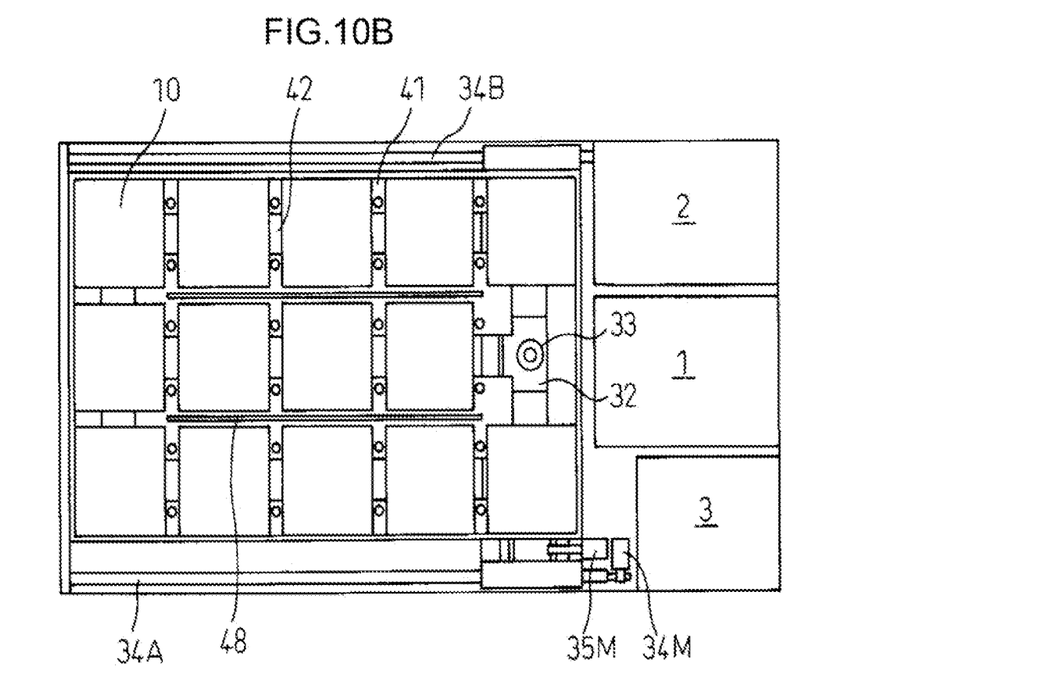
FIG. 10B illustrates an internal structure view of the library apparatus according to the second embodiment.

FIG. 10A illustrates a cell unit of a library apparatus according to a second embodiment. FIG. 10B illustrates an internal structure view of the library apparatus according to the second embodiment. According to the second embodiment illustrated in FIG. 10A, when the robot 30 moves the cartridge B illustrated in FIG. 9A in front of the tape drive unit 1, the robot 30 does not move cartridge A, and does not move the cartridge E in FIG. 9A. Thus, when the cartridge B is moved in front of the tape drive unit 1, the time and the movement distance can be shortened.

In the embodiment described above, the cell unit 40 has the bottom plate 41 that stores three cartridges 10 in width direction and four cartridges 10 in depth direction. However the cell unit 40 may have the bottom plate 41 that stores three cartridges 10 in width direction and five cartridges 10 in depth direction.

The accommodation number of cartridges 10 stored in the rack space of 1U can be increased according to the embodiment. This is because the cell unit 40 is arranged in the entire area other than the drive unit 1, the power supply unit 2, and the control unit 3 in the housing so that the cartridges 10 can be moved in the area. Further this is because the robot is arranged under the cell unit to move the cartridge.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A library apparatus, comprising:
a drive unit for writing data into or reading data from a cartridge;
a cell unit having a plurality of cells to store the cartridges and a bottom plate in which a guide groove is formed;
a movement unit for moving the cartridge along the guide groove between the cell and the drive unit, the movement unit being arranged under the cell unit;
a control unit for controlling the movement unit to move up through the guide groove, to engage the cartridge, and to move the engaged cartridge;
a housing; and
a power supply unit,
the power supply unit, the drive unit, the control unit and the movement unit are arranged on the bottom date of the housing, and the movement unit and the cell unit are arranged in an area of the housing other than the area where the power supply unit, the drive unit and the control unit are arranged,
a clutch which engages a reel of the cartridge is provided on the top of the movement unit, and the clutch is movable up and down.

2. The library apparatus according to claim 1, wherein the cell unit has a size that three cartridges in the right-left direction and four cartridges or more in the depth direction can be stored side-by-side.

3. The library apparatus according to claim 2, wherein the cell unit has a size that four cartridges in the depth direction can be are arranged side-by-side.

4. The library apparatus according to claim 2, wherein the cell unit has a size that five cartridges in the depth direction can be arranged side-by-side.

5. The library apparatus according to claim 1, wherein the guide groove has a plurality of first guide grooves each of which extends in the depth direction of the housing and a plurality of second guide grooves each of which connects one ends of the first guide grooves in the right-left direction of the housing, respectively.

6. The library apparatus according to claim 1, wherein the cell unit includes a locking member in the bottom plate, the locking member prevents the cartridge stored in the cell unit moving in the depth direction and in the right-left direction, and allows the movement of the cartridge when the cartridge is moved by the movement unit.

7. The library apparatus according to claim 6, wherein the locking member includes a plate spring that has a projection provided on one end, and the other end of the plate spring is fixed with the bottom plate of the cell unit, wherein a retraction groove that is connected to the guide groove is formed on the bottom plate of the cell unit that opposing the projection, and the projection is pushed into the retraction groove when the plate spring is forced by the cartridge.

8. The library apparatus according to claim 1, wherein the movement unit includes a first base that is movable in the depth direction of the housing and a second base that is movable in the right-left direction of the housing, the first base has a picker that is movable up and down and engages to a recess provided on a side of the cartridge for moving the cartridge to the drive unit.

9. The library apparatus according to claim 8, wherein the guide groove has a third guide groove that allows the picker to move the cartridge.

10. The library apparatus according to claim 9, wherein the picker is engaged to the recess of the cartridge which is ejected from the drive unit when the movement unit takes the cartridge out of the drive unit to a position to be capable of moving the cartridge by a clutch.

11. The library apparatus according to claim 1, wherein a supporting wall for suspending the cell unit is provided between a plurality of the guide grooves as the suspension member, and a free end of the supporting wall is fixed with the top of the housing.

12. The library apparatus according to claim 1, wherein the guide groove includes a plurality of first guide grooves and a plurality of second guide groove, and the first guide grooves extend in depth direction of the housing and each of the second guide grooves connects in the right-left direction with one of the ends or an intermediate portion of the first guide grooves.

13. The library apparatus according to claim 1, further comprising a front panel having an inserting/ejecting port to exchange the cartridge stored in the cell unit.

\* \* \* \* \*